United States Patent [19]

Watanabe et al.

[11] Patent Number: 4,981,321
[45] Date of Patent: Jan. 1, 1991

[54] VEHICLES PROVIDED WITH SLIDE DOOR

[75] Inventors: Tomoyoshi Watanabe, Hamamatsu; Kazunobu Hori, Kosai, both of Japan

[73] Assignee: Suzuki Motor Company Limited, Shizuoka, Japan

[21] Appl. No.: 395,333

[22] Filed: Aug. 17, 1989

[30] Foreign Application Priority Data

| Aug. 19, 1988 | [JP] | Japan | 63-205777 |
| Aug. 22, 1988 | [JP] | Japan | 63-207587 |
| Aug. 31, 1988 | [JP] | Japan | 63-218161 |
| Aug. 31, 1988 | [JP] | Japan | 63-218162 |

[51] Int. Cl.$^5$ ............................................. B60J 5/06
[52] U.S. Cl. ......................................... 296/155; 49/213
[58] Field of Search .................. 296/155, 209; 49/213, 49/214

[56] References Cited

U.S. PATENT DOCUMENTS

| 4,506,911 | 3/1985 | Nakamura et al. | 296/155 |
| 4,580,823 | 4/1986 | Yamada et al. | 296/155 |
| 4,582,357 | 4/1986 | Nakamura et al. | 296/155 |

FOREIGN PATENT DOCUMENTS

| 1548510 | 6/1968 | France . |
| 33016 | 2/1982 | Japan . |
| 14520 | 1/1984 | Japan . |
| 2126173 | 3/1984 | United Kingdom . |

*Primary Examiner*—Robert R. Song
*Attorney, Agent, or Firm*—McGlew and Tuttle

[57] ABSTRACT

The present invention relates to a structure of a lower rail for guiding a slide door and a mounting structure to a side sill. A part of the side sill is projecting externally and covers the upper part of the lower rail. The top end portion of the lower rail is bent inside the side sill and is fastened to the rail housing box and the floor side panel. The roller supporting member for supporting the roller and the arm being fastened to the door are connected by means of a pin. A groove is formed on the bottom wall of the rail housing box corresponding to the moving range of the pin, and the height of the rail housing box is reduced by letting the above-mentioned pin face inside the groove. And, both the stopper at the rear end portion of the rail and the leaf spring are formed independently each other, then the stopper is inserted into an opening of a rail and the leaf spring is assembled to the rail from above the rail so that the both may be assembled with one screw from above the rail.

8 Claims, 5 Drawing Sheets

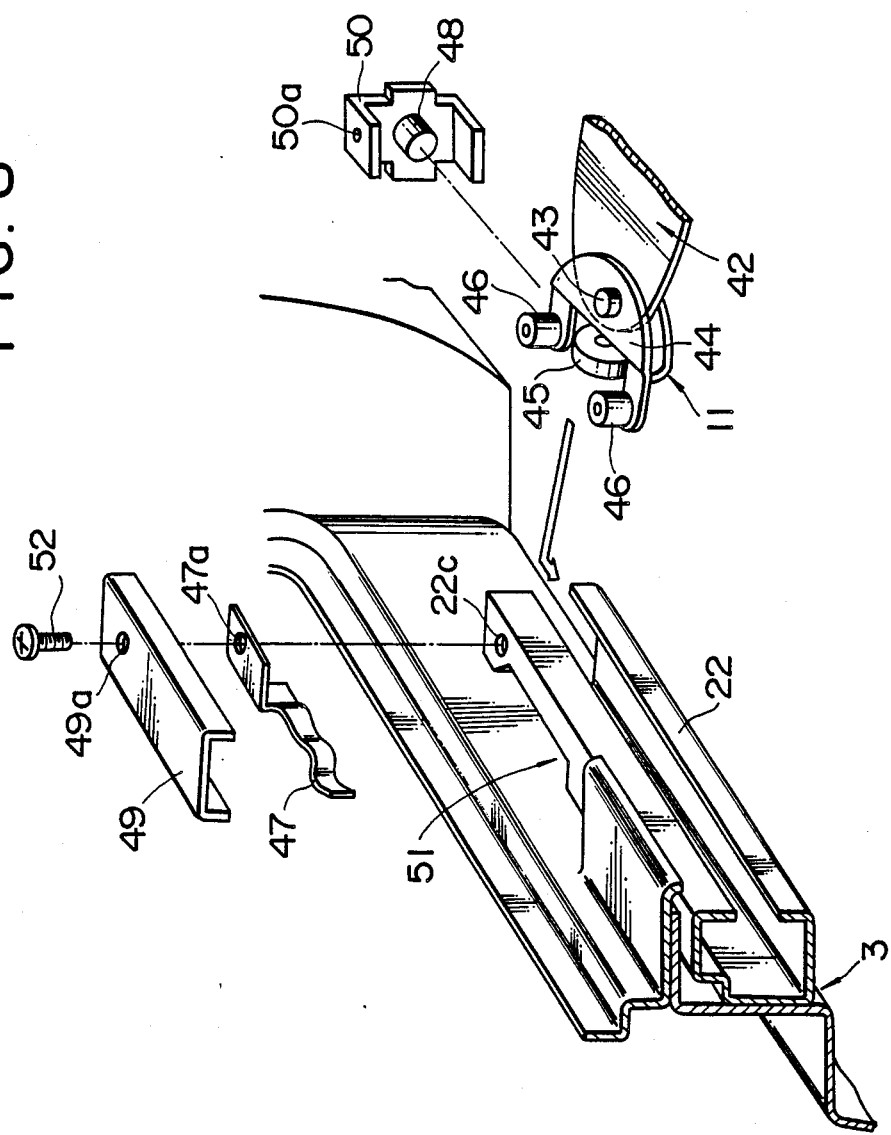

VEHICLES PROVIDED WITH SLIDE DOOR

FIELD OF THE INVENTION AND RELATED ART STATEMENT

The present invention relates to a vehicles equipped with a slide door, more particularly, the invention relates to a lower rail for supporting and guiding a door and for guiding the door backwardly along a side body.

In the case of a conventional type vehicle slide door an upper rail, a center rail, and a lower rail are arranged connected to the roof panel, rear quarter panel, side sill, etc., all of which compose the side body of the vehicle, thereby the door can be guided along the side body.

Here, the lower rail is fixed in the state where it is exposed to the outer wall of the side sill.

However, since the side sill is located at the lower part of the door opening region, and is positioned outside of the weather strip, the side sill serves as the place to collect rainwater flowing down along the weather strip. On account of this, in the structure where the lower rail is assembled projecting from the said sill, the rainwater penetrates the side sill through the hole of mounting bolts, etc., leaving the problem unsolved, i.e., the lower rail itself is prone to generation of rust.

Furthermore, the lower rail cannot help being positioned crossing the passengers' stepping region, and consequently in its exposed state, there is the undesirable possibility of the lower rail being dameged or deformed due to external forces of a stepping foot, etc., and accordingly the lower rail is prone to fouling.

Here, the lower rail, in order to shut the door, has the top end formed to be bent inwardly. Subsequently, an opening region is formed at the side sill so that the top end bent region of the lower rail may come in. In the opening region the housing box is fixed by welding at the side sill opening region for housing and supporting the top-end bent region of the lower rail and for preventing rainwater, etc., from penetraing the side sill.

For assembly of the lower rail is carried out by means of the side wall of the side sill at the linear part thereof and by the side wall of the housing box as well as by respective mounting bolts at the top-end bent region. And, taking into account the mounting operability, operating holes are provided at the floor side panels.

Here, the vehicle having a slide door, when the said door is shut, is exposed to a load which concentrates on the top-end bent region of the lower rail, moreover, a vibration load is also applied during travel. Accordingly, mounting strength and rigidity are required in the mounting vicinity.

However, in the case of the mounting structure of the above-mentioned lower rail, there is some uneasiness in terms of strength because the top-end bent region of the lower rail is fixed with bolts on the side wall of the housing box, (in other words, on the side wall existing in a lifted state) which is welded and fixed at the opening region of the side sill. In order to improve the riqidity, therefore, it is required either to increase the plate thicknesses of the side sill and housing box or to add reinforcing parts.

However, any of these countermeasures results in an increase of costs and disadvantages in the economic efficiency.

Meanwhile, the sliding door has an arm fixed at the lower part thereof, and a roller supporting member is rotatably mounted onto the said arm by the use of pins. And, the roller of the roller supporting members is engaged with the lower rail, thereby the slide door is mounted at the side sill. In the supporting structure of the above-mentioned slide door, the pins are inserted into both the roller supporting member and the arm; these are mutually linked by crimping the pin ends. The internal height of the above-mentioned rail-housing box is set to be fixed to the height of both pin lengths with suitable clearances.

In the supporting structure of such a slide door in order to increase the slide door supporting strength, it is necessary to expand the coupling range of the arm and the roller supporting members, that is, to enlarge the pin lengths, and subsequently, the internal height of housing box has to be made taller.

When the internal height of the housing box is made taller, there is a need to increase the plate thickness of the housing box to reinforce the ho::sing box, resulting in inconvenience of a passenger for riding in and off due to increased height of the side sill.

The rear end of the above-mentioned lower rail is provided with leaf springs for positioning the slide door at its opened state and stoppers for preventing the slide door to be derailed from the lower rail. These leaf springs and stoppers are previousely fixed with mounting brackets, and are arranged at the specified positions, by fastening them at the lower rail with screws.

Additionally, in the above-mentioned vehicle, long mounting brackets having leaf springs are inserted through the rear end opening of the lower rail and are engaged with the lower rail. Therefore, the work of assembly has been made complicated.

OBJECT AND SUMMARY OF THE INVENTION

The present invention aims at providing a vehicle provided with a slide door which has rails firmly held and protected through a further improvement in ease in getting on and off the vehicle.

Another object of the present invention is to the vehicle provided with a slide door whose stopper is assembled to a rail in a simplified manner.

In order to achieve the above-mentioned objects, in the vehicle provided with a slide door, the construction of the present invention makes a part of the side sill protrude over the upper surface of the rail in a covering manner.

With such structure, &he strength of the side sill itself can be reinforced, therefore, the rail can be firmly supported. In addition, the protruding portion of the side sill protects the rails from rainwater, etc., moreover, the rail is not an inconvenience to a passenger when the passenger gets on an off the vehicle.

The side sill is composed of the lower panel whose lower end region is fastened to the lower part of the floor side panel and whose intermediate region supports the afore-mentioned rail, as well as of the upper panel whose upper end region is fastened to the upper part of the afore-mentioned floor side panel. It is also possible to form a rail cover by overlapping the upper end region of the afore-mentioned lower panel with the lower end region of the afore-mentioned upper panel, by bending the overlapped portions above the afore-mentioned rail, and by mutually fastening the bent up portions.

Furthermore, it is possible to improve the strength of the side sill by attaching and fastening a reinforcing plate to the afore-mentioned lower panel and the afore-mentioned upper panel. As an additional advantage of the vehicle provided with a slide door of this invention, an opening is formed at the front end portion of the afore-mentioned side sill, and a rail housing box is arranged from the opening towards the inside of the side sill, then the top end portion of the afore-mentioned rail is bent and housed in the box, in addition, the top end portion of the afore-mentioned rail, the afore-mentioned rail housing box, and the floor side panel are jointly tied up with bolts and nuts.

In conformity with such structure, the rail is supported not only with the rail housing box but also with the floor side panel, consequently, the supporting intensity increases. Furthermore, the roller is supported with the roller supporting members, and the supporting members are supported with an arm in an oscillatorily free manner by means of a pin, and in the case where the arm is fixed at the afore-mentioned door, it is possible to reduce the height of the housing box by providing a groove in the bottom wall of the housing box along the movable range of the afore-mentioned pin, by facing the lower end of the afore-mentioned pin, and by arranging a roller assembly.

To adopt such structure, the intensity of the housing box can be improved. And, it is possible to reduce the height of the side sill and thereby a passenger can get on and off the vehicle more smoothly.

In the case of the vehicle provided with slide door of the present invention, the rear end of the afore-mentioned rail is opened and possesses a leaf spring inserting hole and a screw driving hole on the upper wall of the rear end region thereof. Moreover, the afore-mentioned rail possesses a leaf spring with a screw driving hole This arranged from the afore-mentioned leaf spring inserting hole along the afore-mentioned rail in order to apply a braking force to the afore-mentioned door by coming into contact with the afore-mentioned roller. A cover with a screw driving hole is provided which clogs the leaf spring inserting hole of the afore-mentioned rail. A mounting bracket with a screw hole at the upper part is provided, one side of which is provided with a stopper and the stopper is inwardly inserted into the rear end opening of the afore-mentioned rail.

Screws are driven through the screw driving holes of the afore-mentioned cover, leaf spring, and rail, engaged with the screw hole of the afore-mentioned mounting bracket. With this arrangement the afore-mentioned cover, leaf spring, and mounting bracket are tied up to the afore-mentioned rail.

In compliance with such structure, the leaf spring can be installed from above into the lower rail, moreover, a screw clamping can be carried out from above the lower rail, therefore, assembly work can be made extremely simplified.

BRIEF DESCRIPTION OF THE DRAWINGS

FIG. 8 is a disassembled diagonal view of the stopper installed to the rear end of the rail.

DETAILED DESCRIPTION OF PREFERRED EMBODIMENTS

Figure 1:
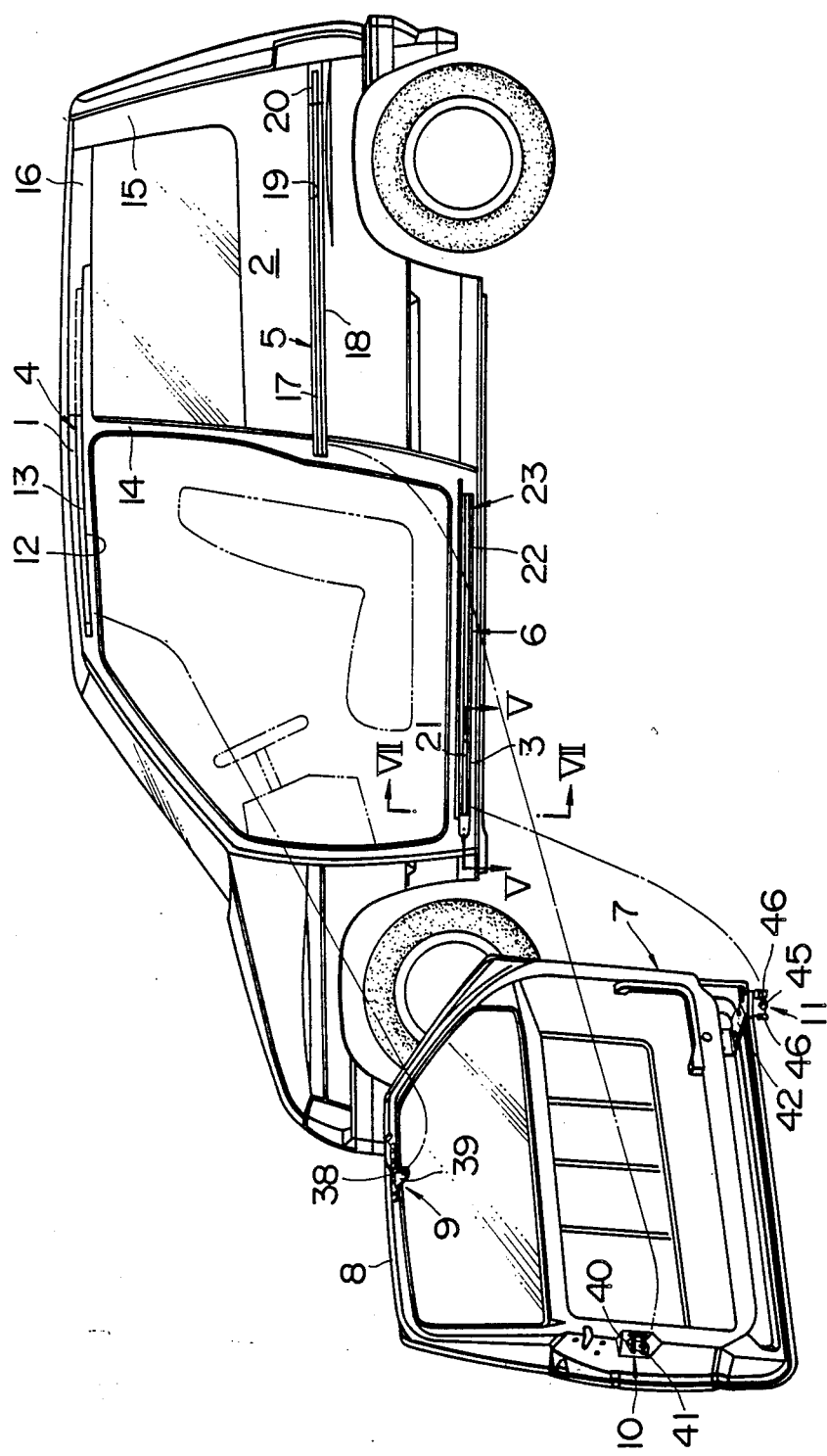
FIG. 1 is a side view showing the vehicle provided with slide door in which the present invention is applied, where the figure particularly shows a view of the vehicle body from which the sliding door is removed.

The vehicle shown in FIG. 1 is provided with a roof panel 1, a rear quarter panel 2, a side sill 3, an upper row guiding means 4 an intermediate row guiding means 5 and a lower row guiding means 6, in addition, the upper, intermediate, and lower rows of the door inner panel 8 of the sliding door 7 are installed with the roller assemblies 9, 10, and 11, respectively.

The upper row guiding means 4 has the square-cylindered rail (upper rail) 13 on whose lower face thereof the slit 12 is formed, and the rail 13 is provided from the front end of the roof panel 1 to a place between the center pillar 14 and the rear pillar 15. And, from the center pillar 14 of the roof panel 1 to the rear pillar there is provided the trim element (quarter trim element) 16, and the trim element 16 covers a part of the above-mentioned rail 13.

The intermediate guiding means 5 has the square-cylindered rail (center rail) 18 on the side face thereof with the slit 17 formed by the rail 18. This rail 18 is installed in the center rail housing groove 19 that is formed over the entire length of the rear quarter panel 2. The trim element (center trim element) 20 is provided for this center rail housing groove 19, and with the trim element 20 it covers the area where the rail 18 of the center rail housing groove 19 is not provided.

The lower row guiding means 6 has the square-cylindered rail (lower rail) 22 on whose side face thereof the slit 21 is formed. This rail 22 is provided over the entire length of the side sill 3, and the stopping means 23 is installed at the rear end of the rail 22.

Figure 2:
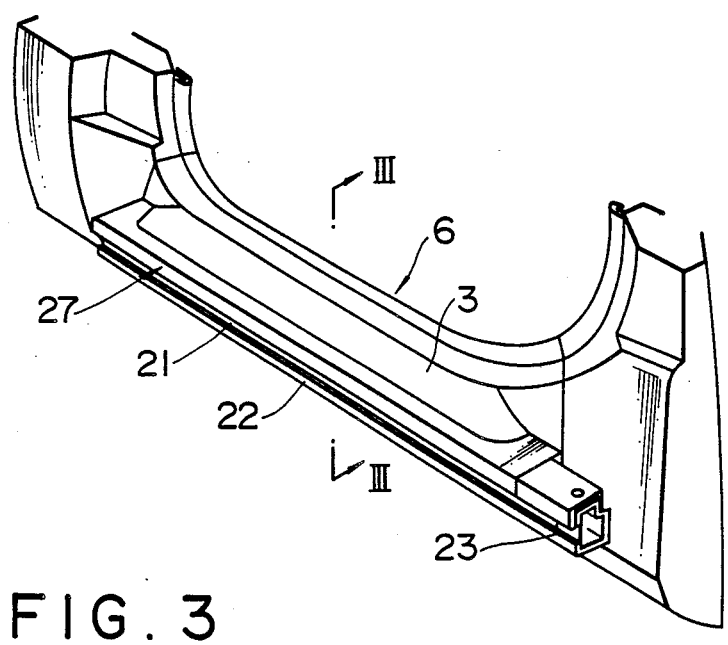
FIG. 2 is a perspective view showing the side sill of the vehicle.
Figure 3:
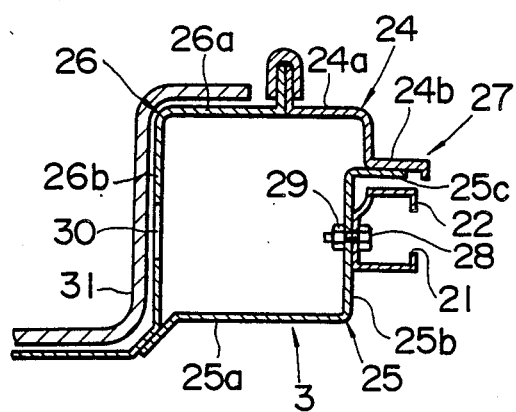
FIG. 3 is a cross sectional view of the side sill cut off with the line III—III indicating the setting state of the side sill to the rail.
Figure 4:
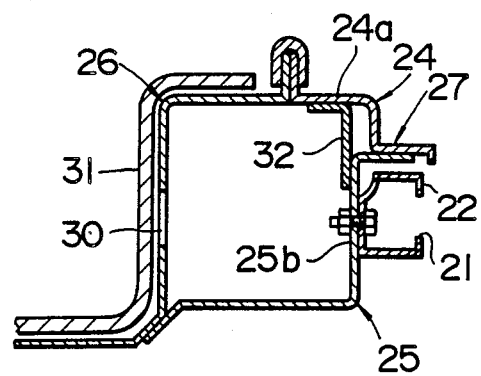
FIG. 4 is a cross sectional view showing an example of features improving the strength of the side sill shown in FIG.3.

To describe in detail the vehicle structure of this lower row guiding means 6 in accordance with FIG. 2 and FIG. 4, the side sill 3, on which the lower rail 22 is fixed, is composed of the side sill upper panel 24 and the side sill lower panel 25. The side sill upper panel 24 is composed of the flat region 24a, which is welded and fixed to the upper flat region 26a of the floor side panel, and the cover 24b whose end stretches as far as the position to cover the upper region of the lower rail 22 fixed from the flat region 24a. On the other hand, the side sill lower panel 25 is composed of the flat region 25a one of whose ends is welded and fixed to the lower side wall 26b of the floor side panel 26 as well as of the cover 25c which is formed by bending the top end portion of the vertical region 25b. The lower face of the top end of the cover region 24b of the above-mentioned side sill upper panel 24 is welded and fixed to the upper face of the top end of cover region 25c of the side sill lower panel 25 and thereby the floor side panel 26. The side sill upper panel 24 and side sill lower panel 25 form a closed cross section, moreover, they form the cover 27 which covers the upper region of the lower rail 22. The linear region 22a of the lower rail 22 of the sliding type door 7 is screwed and fixed at the vertical region 25b of the side sill lower panel 25 by means of the bolt 28 and the nut 29. The clamping tool of the nut 29 is inserted from the hole 30 which is provided to the side panel 26, and this hole 30 is covered with the floor carpet 31 which is attached to the vehicle floor. When more strength is required for the side sill 3, its rigidity is reinforced as shown in FIG. 4 by providing the reinforcing plate 32 weldingly fixed between the vertical region 25b of the lower panel 25 and the flat region 24a of the upper panel 24.

Figure 5:
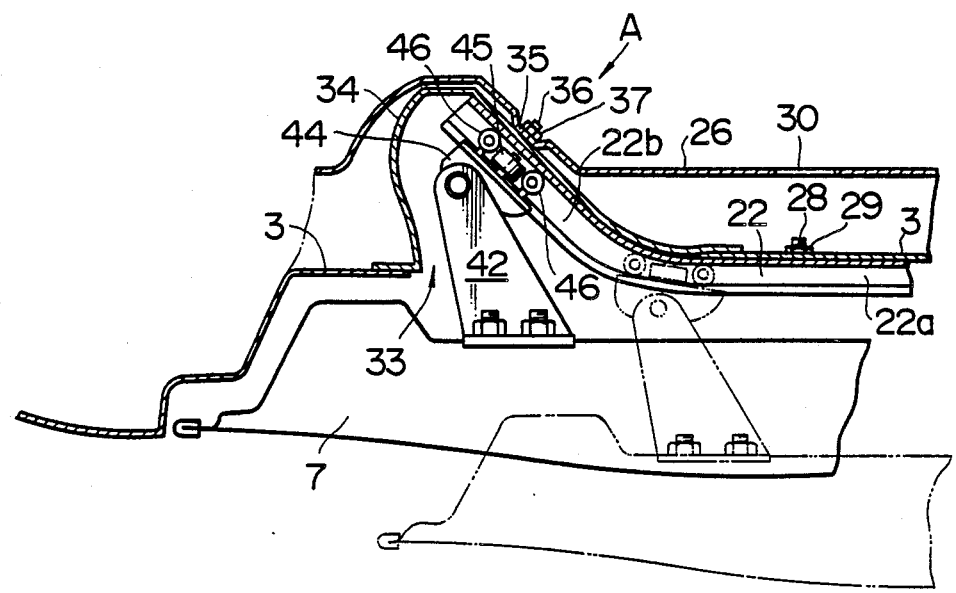
FIG. 5 is a cross sectional view of the vehicle in FIG. 1 cut off with the line V—V to illustrate the mounting structure of the rail top end.
Figure 6:
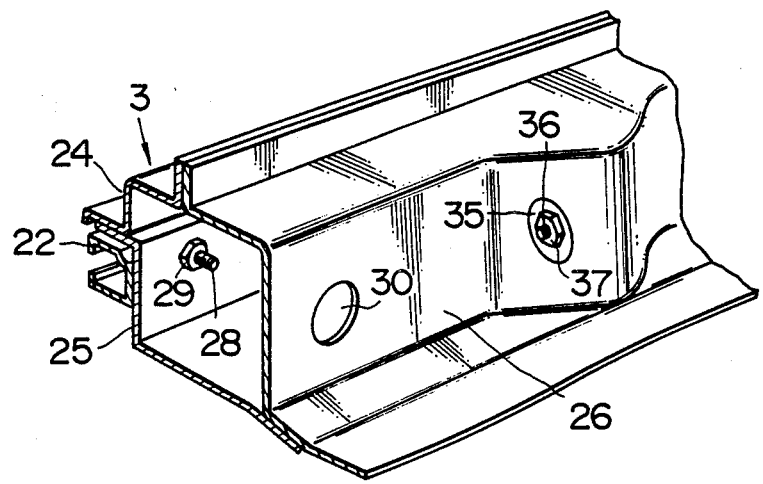
FIG. 6 is a cross sectional diagonal view of the region in FIG. 5 seen from the direction A.

The top end of the lower rail 22 is formed in a bent manner inside the side sill 3 in order to close the slide door 7 as shown in FIG. 5. Therefore, the opening 33 is formed at the side sill 3 so that the top-end bent region 22b of the lower rail can come in. The housing box 34 is welded and fixed to the side sill opening region 33 in order to house and support the top end bent region 22b of the lower rail and to prevent rainwater, etc., from penetrating the side sill 3.

The bearing surface 35, which is concaved in the mounting position of the top-end bent region 22b of the lower rail, is formed at the floor side panel 26. This bearing surface 35 is configured so that it comes in contact with the rear surface of the side wall of housing box 34 and in that region the side floor panel 26, housing box 34 and the top-end bent region 22b of the lower rail are jointly fastened by means of the above-mentioned mounting bolts 36 and the nut 37.

On the other hand, with respect to the upper row roller assembly 9 of this vehicle, the roller 38 is installed to the arm 39, and the arm 39 is fixed to the door inner panel 8.

Figures 7, 9:
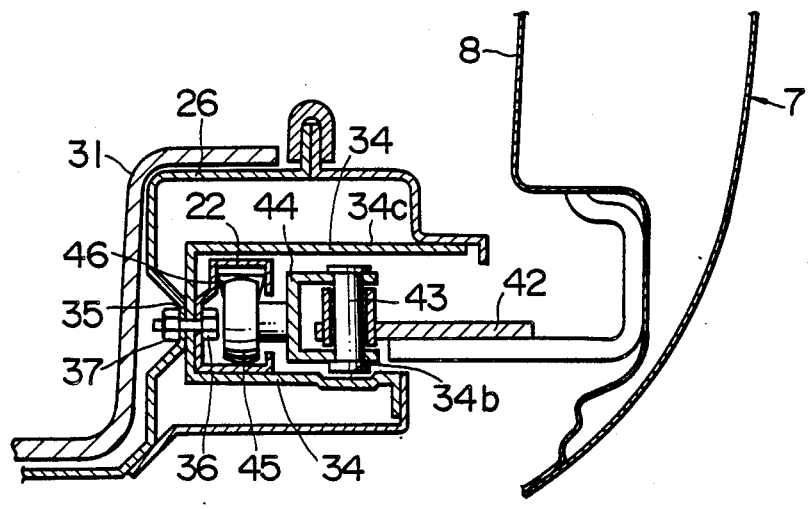
FIG. 7 is a cross sectional view of the vehicle in FIG. 1 cut off with line VII—VII.
FIG. 9 is a cross sectional view illustrating the state where the stopper is assembled to the rail.

And, with respect to the intermediate row roller assembly 10, the roller 41 is fixed at the door inner panel 8 via the roller supporting member 40. Furthermore, with respect to the lower row roller assembly 11, as shown in FIG. 5 and FIG. 7, the arm 42 is fixed to the door inner panel 8, and to the arm 42 and is connected with the roller supporting member 44 by means of pin 43. Both the main roller 45 and the subroller 46 are provided connected to the roller supporting member 44.

Respective rollers 38, 41, 45 and 46 of the above-mentioned roller assemblies 9, 10 and 11 configured thus are inserted into the rails 13, 18 and 22 of respective guiding means 4, 5 and 6, thereby the sliding door 7 is supported at the car body. Then, at the front end region of the lower row guiding means 6, as shown in FIG. 7, the groove 34b is formed along the moving range of the above-mentioned pin 43 on the bottom wall 34a of the housing box 34. The clearance between the upper end of pin 43 and the ceiling wall 34c of the housing box 34 is secured by housing the lower end of pin 43 in the groove 34b.

This stopper means 23 has, as shown in FIG. 8, both the leaf spring 47 and the stopper 48. The leaf spring 47 is fixed to the rear surface of the cover 49 by either welding or adhesive, etc. The stopper 48 is formed with cushion material and the stopper 48 is fastened to the mounting bracket 50 by means of adhesive or the like. On the other hand, the hole 51 having a length corresponding to the above-mentioned leaf spring 47 is formed on the rear, upper wall of the rail 22.

And, this stopper means 23, after engaging respective roller assemblies 9, 10 and 11 with the respective rails 13, 18 and 22 of the side rail, makes the leaf spring 47 face inside the rail 22 through the hole 51 of the rail 22, in addition, it covers the hole 51 by means of the cover 49, and makes the stopper 48 inside the rail 22 engage the mounting bracket 50 with the end surface opening of the rail 22. Next, the stopper means inserts the screw 52 into the formed holes of 49a, 47a and 22c at the cover 49, leaf spring 47 and the rail 22 and are assembled by screwing the screw 52 into the screw hole 50a of the mounting bracket 50.

FIG. 9 shows the geometrical relationship between the stopper means 23 thus assembled and the roll assembly 11.

The rollers 45 and 46 are rolled inside the rail 22 and when the roller 45 reaches a terminal end of the rail 22, the roller 46 comes into contact with the leaf spring 47 and is positioned there by energized force of the leaf spring. In the event that the sliding door 7 is opened vigorously and subsequently the roller 46 does not stop at the leaf spring 47, the roller supporting member 44 bumps against the stopper 48 and is stopped with the said stopper 48.

And, in the case of the above-mentioned example, the leaf spring 47 and the cover 49 are formed separately and they are welded together It is also possible integrally, to form the leaf spring 47 and the cover 49.

What is claimed is:

1. A vehicle provided with a side door, comprising:
a vehicle floor side panel,
a side sill connected to said floor side panel, said side sill provided with a square cylindrical rail having a slit extending in a longitudinal direction of the side sill and a roller being engaged with said rail at a door to allow said door to be closed backwardly along a side body,
said side sill having a projecting part for covering an upper face of said rail to form a rail cover, said side sill including a lower panel with a lower end portion fixed with a lower part of said floor side panel, and an upper panel with an upper end portion fixed with an upper portion of said floor side panel, an upper end portion of said lower panel and a lower end portion of said side upper panel being superposed and bent at an upper portion of said rail and fixed with each other adjacent to the bent portion to form said rail cover.

2. The vehicle provided with the slide door according to claim 1, wherein a reinforced plate is fixed across said lower panel and said upper panel.

3. A vehicle provided with a slide door, comprising:
a side sill provided with a square cylindrical rail having a slit extending in a longitudinal direction of the side sill and a roller connected to a door and being engaged with said rail to allow said door to be closed backwardly along a side body,
said side sill having an opening at its front side end, a rail housing box positioned in said opening to extending to an inner portion of said side sill, said rail housing box receiving a bent edge portion of said rail, each of a front end portion of said rail, said rail housing box and a floor side panel being fastened by means of a bolt and a nut.

4. The vehicle provided with the slide door according to claim 3, wherein said roller is supported by a roller support member, said support member is rotatably provided with an arm engaging through a pin, said arm being fixed with said door, said housing box having a groove formed along a movement region of said pin in its bottom wall, and a roller assembly facing said groove.

5. A vehicle provided with a slide door, comprising:

a side sill provided with a square cylindrical rail having a slit extending in a longitudinal direction of the side sill and a roller being engaged with said rail at the door to allow said door to be closed backwardly along a side body, said rail is provided with an opening in its back end portion and a leaf spring insertion hole, and a screw through hole on the upper wall of its back end portion, a leaf spring arranged to face in said rail from said screw through hole and said leaf spring insertion hole to apply a braking force to said door by contact with said roller, a cover for covering said leaf spring insertion hole of said rail, said cover being provided with a screw through hole, a mount fitting having a screw hole in an upper portion of said mount fitting and a stopper in a face of said mount fitting to allow said stopper to be inserted into a back end opening of said rail to the inner portion, and a pin inserted through said screw insertion hole of said cover, said leaf spring and said rail engaging with said screw hole of said mount fitting to allow said cover, said leaf spring and said mount fitting to be fixed with said rail.

6. A slide-door-type vehicle comprising a side sill provided with a square cylindrical rail having a slit formed extending in a lengthwise direction of the side sill; a door provided with a roller to engage said rail, said door being opened rearwardly along a side body of the vehicle; an opening formed at the front end of said side sill; a rail housing box having a side defining a housing box opening, said rail housing box being positioned inwardly from said opening of said side sill, an end of said rail being bent and positioned extending into said housing box, said end of said rail, a back wall of said rail housing box and a floor side panel of said vehicle being fastened together by means of a bolt and a nut and an upper edge and a lower edge of said housing box opening being fixed to an edge of said opening of said side sill.

7. The slide-door type vehicle according to claim 6, wherein said roller is supported by a roller support member, said support member being rotatably provided with an arm connected to a pin, said arm being fixed with said door, said housing box having a bottom wall with a groove, formed along a movement region of said pin, a roller assembly being provided facing in said groove.

8. A slide-door-type vehicle comprising: a side sill provided with a square cylindrical rail having a slit so formed as to extend in a lengthwise direction of a side surface thereof; a door with a roller to engage said rail, said door being opened rearwardly along a side body of the vehicle; said side sill being formed with an opening at its front end; a rail housing box received in said opening of said side sill, said rail having its top end bent, said bent top end being received in said rail housing box, said roller being supported by a roller support arm, said support member being swingably supported at said arm through a pin, said arm being secured to said door, the bottom wall of said rail housing box being formed with a groove along the region of movement of said pin and a roller assembly so provided as to have the lower end of said pin extending in said groove.

* * * * *